(12) United States Patent
Migishima et al.

(10) Patent No.: US 9,313,342 B2
(45) Date of Patent: Apr. 12, 2016

(54) IMAGE READING APPARATUS, IMAGE READING METHOD, IMAGE READING SYSTEM, AND STORAGE MEDIUM

(71) Applicant: CANON KABUSHIKI KAISHA, Tokyo (JP)

(72) Inventors: Isao Migishima, Moriya (JP); Yusuke Hattori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/748,007

(22) Filed: Jun. 23, 2015

(65) Prior Publication Data

US 2016/0006888 A1    Jan. 7, 2016

(30) Foreign Application Priority Data

Jul. 4, 2014    (JP) .................................. 2014-139163

(51) Int. Cl.
H04N 1/00 (2006.01)
G06F 15/00 (2006.01)
G06F 3/12 (2006.01)
G06K 1/00 (2006.01)

(52) U.S. Cl.
CPC ....... *H04N 1/00114* (2013.01); *H04N 1/00244* (2013.01); *H04N 1/00411* (2013.01); *H04N 1/00477* (2013.01); *H04N 2201/0081* (2013.01)

(58) Field of Classification Search
USPC .................................................. 358/1.1–1.18
See application file for complete search history.

(56) References Cited

U.S. PATENT DOCUMENTS

| 8,643,913 B2* | 2/2014 | Tagaki et al. ................ 358/474 |
| 8,687,887 B2* | 4/2014 | Norimatsu et al. ........... 382/173 |
| 2013/0188212 A1 | 7/2013 | Pardhan et al. ............... 358/1.14 |

FOREIGN PATENT DOCUMENTS

JP    2013-149254    8/2013

* cited by examiner

*Primary Examiner* — Douglas Tran
(74) *Attorney, Agent, or Firm* — Fitpatrick, Cella, Harper & Scinto

(57) ABSTRACT

To read a plurality of pages, it is necessary to notify a server of completion of transfer from an image reading apparatus and transmit a next page reading input instruction from an operation terminal to the image reading apparatus again via the server. In the above reading operation, time from completion of original reading to the start of reading of the next original is prolonged, and user operability lowers. According to an embodiment of this invention, when reading images of a plurality of pages, the first image reading instruction is input from a user terminal. After that, original placement, reading start instruction, and the like for the next page are performed from an input unit provided in the image reading apparatus. This can reduce the network communication amount and improve the throughput and user operability.

19 Claims, 13 Drawing Sheets

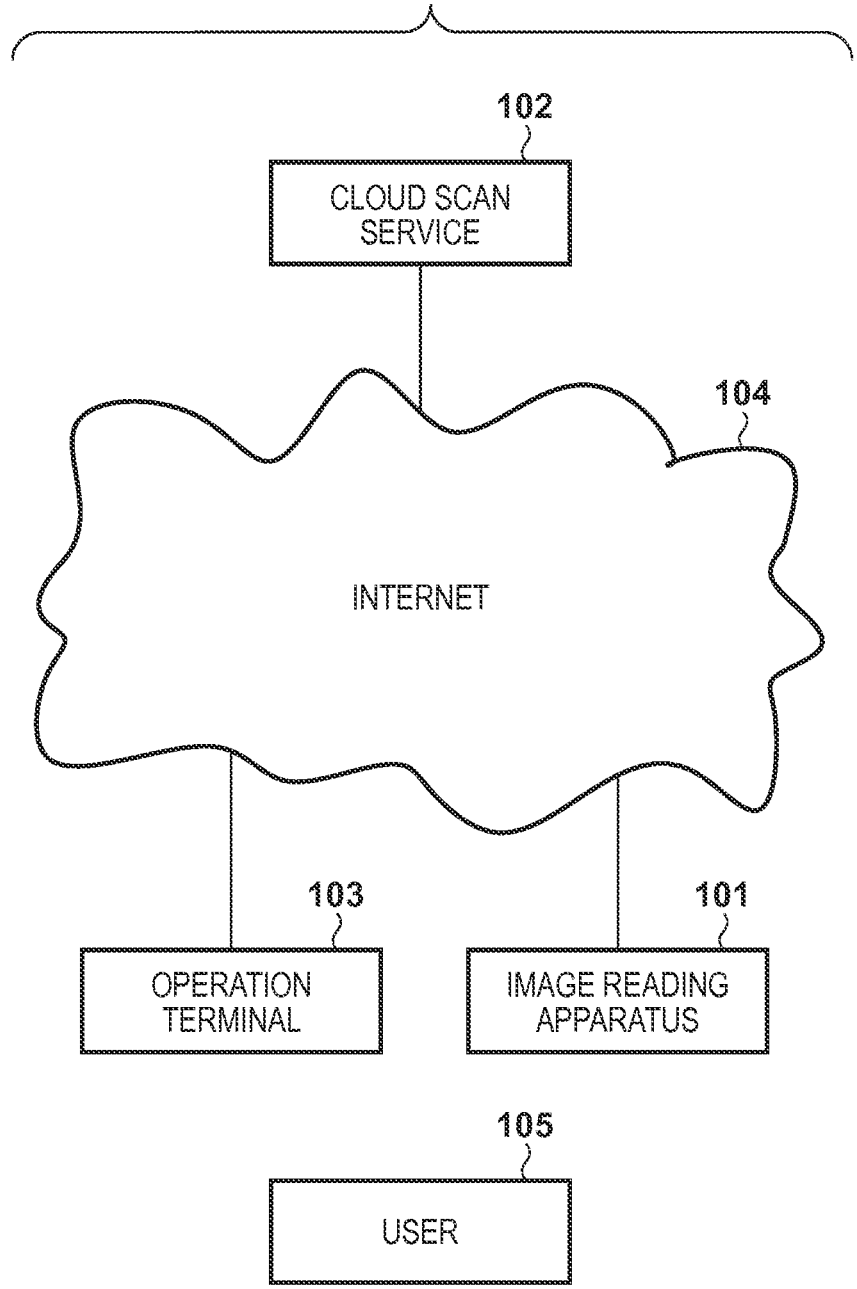

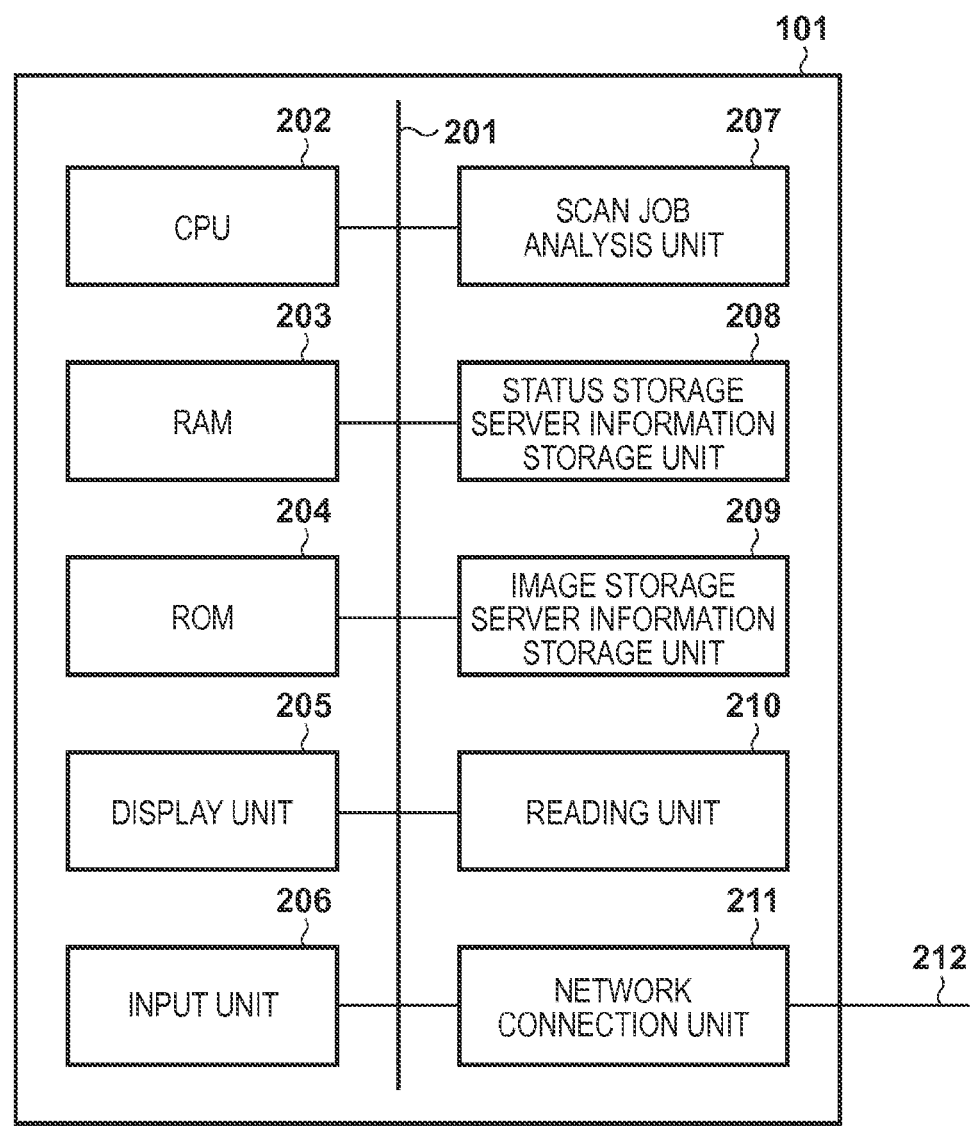

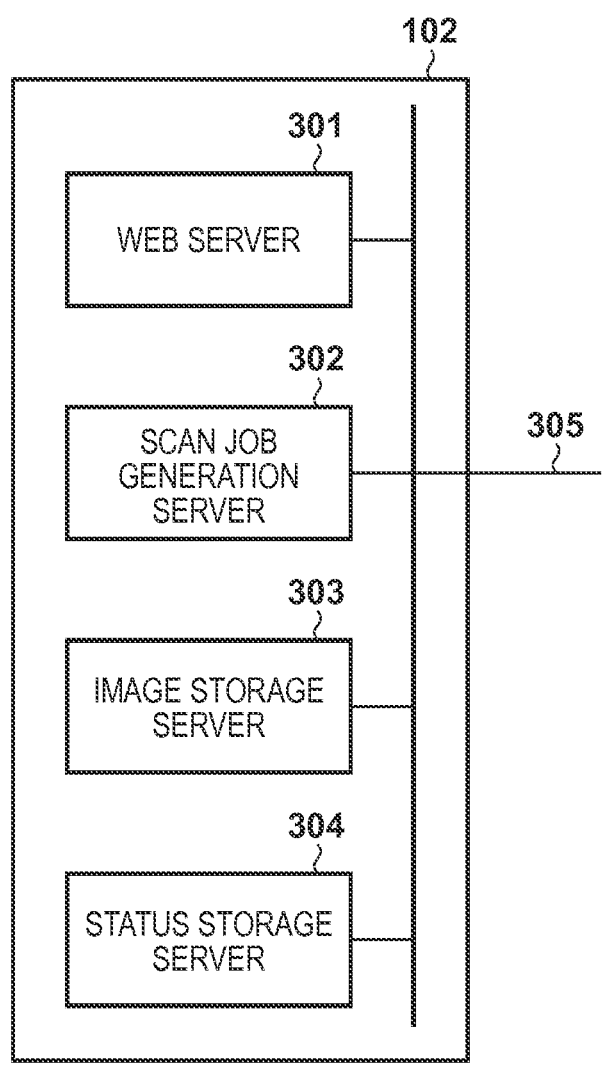

IMAGE READING APPARATUS, IMAGE READING METHOD, IMAGE READING SYSTEM, AND STORAGE MEDIUM

BACKGROUND OF THE INVENTION

1. Field of the Invention

The present invention relates to an image reading apparatus, an image reading method, an image reading system, and a storage medium, and particularly to an image reading apparatus connected to a user terminal via a network such as the Internet, an image reading method, an image reading system, and a storage medium.

2. Description of the Related Art

The number of services called SNS (Social Network Services) using a cloud environment on the Internet has been growing in recent years. A service using the cloud environment allows a plurality of users to do information sharing by saving texts or images on servers from user terminals such as a personal computer or a smartphone. When an image reading apparatus is used to save an image in the cloud environment, a printed product or the like can be read as a distortionless image as compared to an image shot by a digital camera or the like.

For example, Japanese Patent Laid-Open No. 2013-149254 discloses a technique of integrating image acquisition from an image reading apparatus and image addition to a cloud environment and operating them from a terminal.

In Japanese Patent Laid-Open No. 2013-149254, reading by an image reading apparatus is performed by an operation on a user terminal (to be referred to as a terminal hereinafter).

However, in a case where, for example, the user sets a plurality of pages of an original on the image reading apparatus one by one, and the image reading apparatus reads the plurality of pages of the original one by one, the following problem arises when the user inputs a reading instruction to the terminal. That is, the user needs to perform original setting on the image reading apparatus and reading instruction to the terminal repetitively for all pages of the original. The user thus needs to repeat the operations (original setting and reading instruction) on the different apparatuses, that is, the image reading apparatus and the terminal.

SUMMARY OF THE INVENTION

Accordingly, the present invention is conceived as a response to the above-described disadvantages of the conventional art.

For example, an image reading apparatus, an image reading method, an image reading system, and a storage medium according to this invention are capable of improving user operability and efficiently reading an image.

According to one aspect of the present invention, there is provided an image reading apparatus capable of being connected to a server via a network, and reading an image of an original based on a reading instruction from a user terminal via the server, comprising: a reading unit configured to read the image of the original; a display unit configured to display a message to prompt a user to input an instruction concerning reading of a next original after the image of the original is read by the reading unit in accordance with the reading instruction from the user terminal; and an input unit configured to input an instruction from the user to the display by the display unit.

The invention is particularly advantageous since it is possible to improve user operability when connecting to a server in a cloud environment via a network such as the Internet and reading an original.

Further features of the present invention will become apparent from the following description of exemplary embodiments (with reference to the attached drawings).

BRIEF DESCRIPTION OF THE DRAWINGS

FIG. 1 is a block diagram showing the arrangement of an image reading system according to an embodiment of the present invention.

FIG. 2 is a block diagram showing the arrangement of an image reading apparatus.

FIG. 3 is a block diagram showing the arrangement of a cloud scan service.

DESCRIPTION OF THE EMBODIMENTS

Exemplary embodiments of the present invention will now be described in detail in accordance with the accompanying drawings. It should be noted that the relative arrangement of the constituent components and the like set forth in the embodiments do not limit the scope of the present invention unless it is specifically stated otherwise.

In this specification, the terms "print" and "printing" not only include the formation of significant information such as characters or graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, or leather, capable of accepting ink.

An example of an original reading sequence using a terminal will be described here. For example, when instructing an image reading apparatus to start image reading from a terminal, reading an original having a plurality of pages using a flatbed (FB) type image reading apparatus, and saving the images in a server, it is necessary to execute a procedure as shown in FIG. 14.

Figure 14:
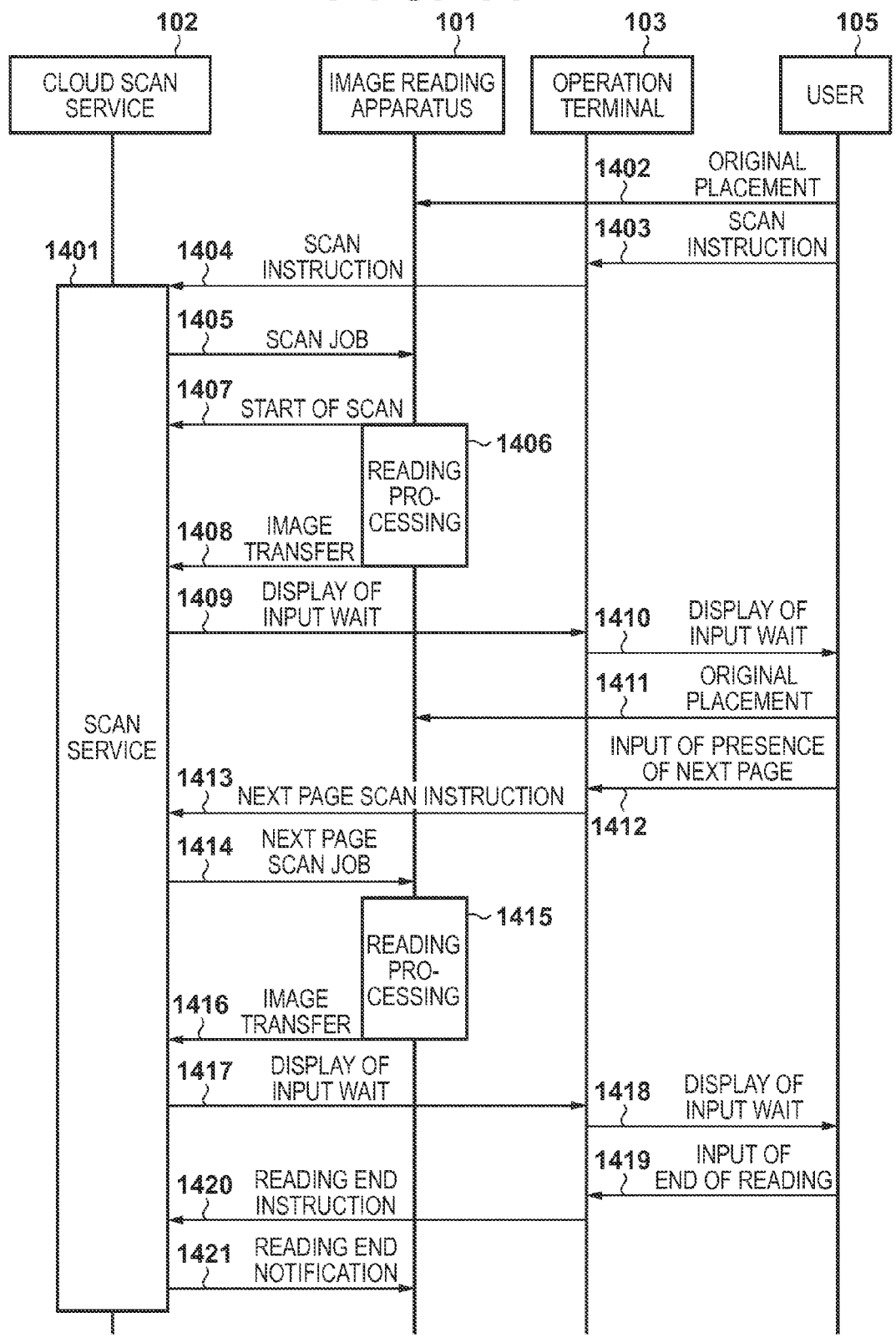
FIG. 14 is a sequence chart showing an example of a communication sequence performed between the cloud scan service and the image reading apparatus.

FIG. 14 is a sequence chart showing a sequence when a user uses an operation terminal to read the images of two pages of an original by an image reading apparatus one by one.

Referring to FIG. 14, a scan service 1401 represents the state of a cloud scan service 102. A user 105 who uses an operation terminal 103 places the first page of an original on the reading table (not shown) of an image reading apparatus 101 (1402). Next, the user 105 inputs a reading start instruction to the operation terminal 103 (1403). In accordance with the instruction input, the operation terminal 103 communicates with the cloud scan service 102 via a network and transmits a reading start request (1404).

In the scan service 1401, the cloud scan service 102 communicates with the image reading apparatus 101 via the network and transmits a scan job in response to the reading start request from the operation terminal 103. Accordingly, the operation of the image reading apparatus 101 changes to a reading state, and reading processing 1406 is executed. In addition, the image reading apparatus 101 communicates with the cloud scan service 102 and notifies it of the start of reading (1407). When the reading processing 1406 ends, the read image is transferred from the image reading apparatus 101 to the cloud scan service 102 (1408). After that, the cloud scan service 102 transmits an input wait screen display request to the operation terminal 103 to prompt the user to read a next image (1409).

Figure 15:
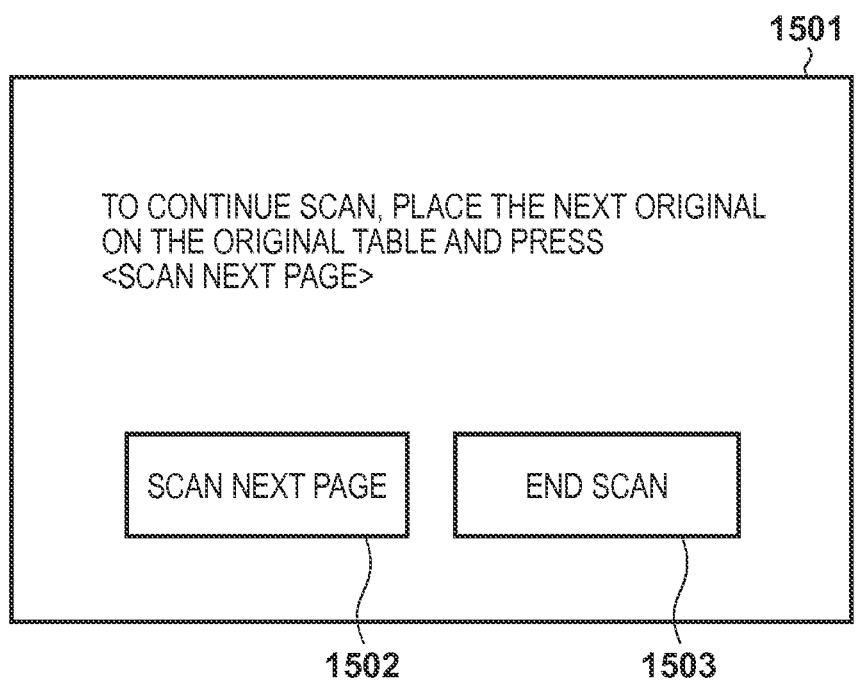
FIG. 15 is a view showing an example of a screen of the operation terminal.

In response to the request, the operation terminal 103 displays a screen as shown in FIG. 15 for the user 105 (1410).

FIG. 15 is a view showing a screen that displays a message to prompt the user to read the next image.

Referring to FIGS. 14 and 15, the user 105 places the second page of the original on the original table of the image reading apparatus 101 (1411). Then, the user 105 presses an icon 1502 for instructing scan of the next page on the screen shown in FIG. 15, which is displayed on the display of the operation terminal 103, to instruct reading of the next page (1412). Upon receiving this instruction, the operation terminal 103 communicates with the cloud scan service 102 via the network and instructs to start reading the next page (1413).

In accordance with the instruction, the cloud scan service 102 transmits a next page scan job to the image reading apparatus 101 (1414) and causes the image reading apparatus 101 to start reading processing 1415. The operation of the image reading apparatus 101 thus changes to a reading state. When the reading processing 1415 ends, the read image is transferred from the image reading apparatus 101 to the cloud scan service 102 (1416). After that, the cloud scan service 102 transmits an input wait screen display request to the operation terminal 103 to prompt the user to read the next image (1417).

In response to the request, the operation terminal 103 displays the screen shown in FIG. 15 again for the user 105 (1418).

In this example, 2-page original reading has been described. Hence, the user 105 presses an icon 1503 for instructing an end of scan, thereby instructing the operation terminal 103 to end scan (1419).

In accordance with the instruction, the operation terminal 103 communicates with the cloud scan service 102 via the network and transmits a reading end notification (1420). In accordance with the instruction, the cloud scan service 102 transmits the reading end notification to the image reading apparatus 101 (1421).

In the example shown in FIG. 14, the user inputs reading instructions (1403 and 1412) to the operation terminal 103 for both the first page and the second page. Hence, in, for example, a flatbed type image reading apparatus, the operation of setting an original on the original table and the operation of instructing reading of the next page need to be performed alternately on the terminal and the image reading apparatus. For this reason, the operation may be cumbersome and undesirable for the user.

In addition, transmission (1409, 1410, 1417, and 1418) of the input wait display request and transmission (1412, 1413, 1419, and 1420) of input information in response to the request are performed twice between the cloud scan service 102 and the operation terminal 103 via a server. Such a communication largely depends on the communication processing capability of the network. If the quality of the network between the cloud scan service 102 and the operation terminal 103 is poor, the communication may take a long time. This is undesirable from the viewpoint of user operability.

To solve this problem, in this embodiment, button operations concerning reading of second and subsequent pages are processed in the image reading apparatus. This embodiment will be described using a network scan system having an arrangement shown in FIG. 1.

FIG. 1 is a block diagram showing the overall arrangement of an image reading system according to the embodiment of the present invention.

As shown in FIG. 1, the image reading system is formed from the operation terminal (user terminal) 103, the image reading apparatus (scanner) 101, and the cloud scan service 102 which are connected via the Internet 104. The image reading apparatus 101 thus functions as a network scan system.

Note that the Internet 104 can be either wired or wireless, or wireless and wired combined.

A typical implementation form of the image reading apparatus 101 is a scanner having a single function of reading an image original. However, it may be a multi function peripheral (MFP) having a scanner function and a printer function or an MFP having a facsimile function as well.

The user 105 performs the operation of the operation terminal 103, the operation of the image reading apparatus 101, and original placement on the original table.

FIG. 2 is a block diagram showing the detailed arrangement of the image reading apparatus 101.

Referring to FIG. 2, a CPU 202 reads out a control program stored in a ROM 204 and executes it using a RAM 203 as a work area. A display unit 205 displays, for example, whether a next page of an original exists or whether reading has ended. An input unit 206 inputs an instruction to continuously read a next page of an original or end reading. The display unit 205 and the input unit 206 are formed by, for example, a display with a touch panel. When the user presses an icon displayed on the display, an input instruction is performed.

A scan job analysis unit 207 analyzes a scan job (to be described later) sent from the cloud scan service 102 or a scan parameter (to be described later) included in the scan job. A status storage server information storage unit 208 stores a status storage server url (to be described later) included in a scan job or the like. An image storage server information storage unit 209 stores an image storage server url (to be described later) included in a scan job or the like. A reading unit 210 is a flatbed type reading unit that reads an original on a page basis in accordance with a scan parameter analysis result. A network connection unit 211 connects to the Internet by a network connection function. A network interface 212 is an interface used to connect the image reading apparatus 101 to the Internet 104.

FIG. 3 is a block diagram showing the arrangement of the cloud scan service 102. As shown in FIG. 3, the cloud scan service 102 includes a web server 301, a scan job generation server 302, an image storage server 303, and a status storage server 304.

The web server 301 is a server used to do web page display and input for input/output for an operation of the cloud scan service, as will be described later. The scan job generation server 302 is a server used to receive a scan setting from the web server 301, generate a scan job (to be described later), and notify the image reading apparatus 101 of the generated scan job. The image storage server 303 is a server used to store an image read by the image reading apparatus 101. The status storage server 304 is a server including a database and used to receive scan job processing state information from the image reading apparatus 101 and store it in the database. A network interface 305 is an interface used to connect the cloud scan service 102 to the Internet 104.

FIGS. 4A to 4D are views showing examples of screens displayed on the operation terminal 103.

FIGS. 4A, 4B, 4C, and 4D show a web page 401, a web page 404, a web page 407, and a web page 408 displayed on the operation terminal 103, respectively.

Figure 4A:
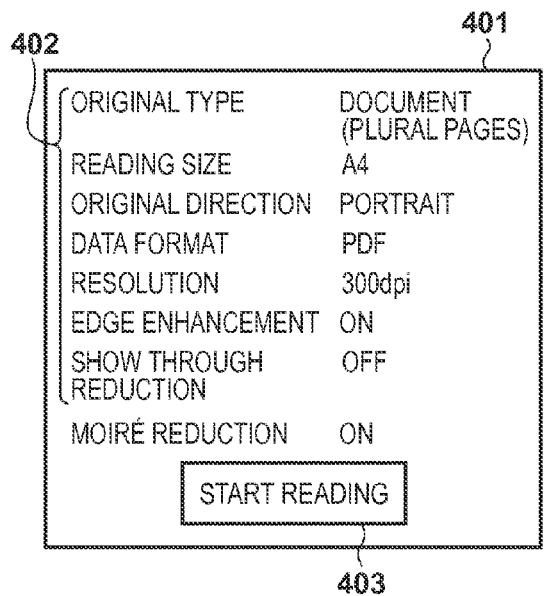
FIGS. 4A, 4B, 4C, and 4D are views showing examples of operation screens of an operation terminal.
Figure 4B:
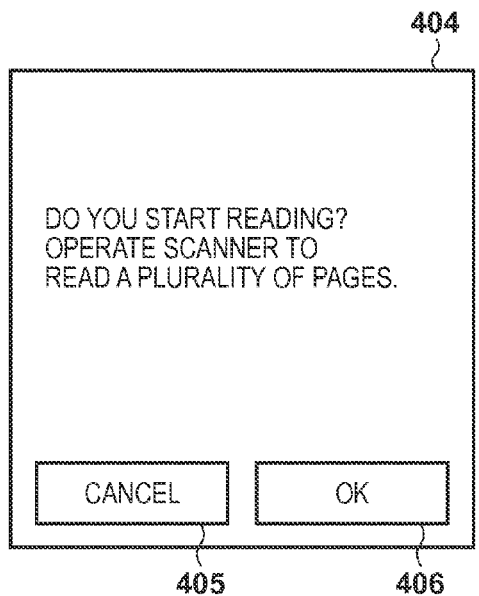
Figure 4C:
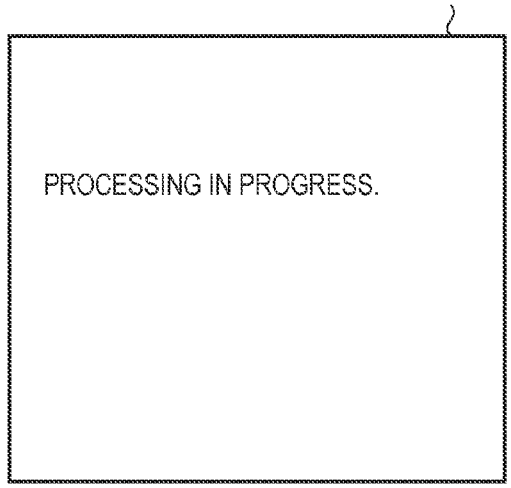

First, when the user 105 accesses the web server 301 using the operation terminal 103, the web page 401 is displayed. Referring to FIG. 4A, an icon 402 indicates scan setting items that the user 105 can designate. When the user presses an icon 403, the web page 404 shown in FIG. 4B is displayed. When the user presses an icon 405 on the web page 404, an instruction to stop the scan operation is issued. When the user presses an icon 406, the web server 301 notifies the scan job generation server 302 of the scan settings via the network interface 305. Based on this notification, the web page 407 shown in FIG. 4C is displayed.

Figure 4D:
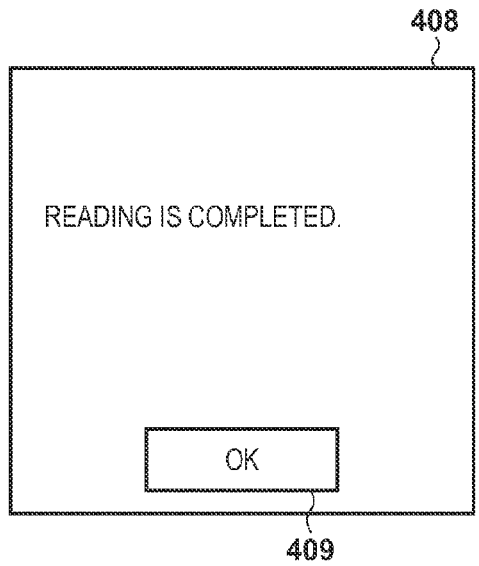

Note that the web page 408 shown in FIG. 4D will be described later.

Image reading processing performed by the image reading apparatus 101 in accordance with instructions from the user 105 who uses the operation terminal 103 in the cooperation of the operation terminal 103, the image reading apparatus 101, and the cloud scan service 102 of the system arrangement shown in FIG. 1 will be described next.

To explain the advantages of the present application in comparison with the related art, an example in which the same condition as described with reference to FIG. 14 is used, that is, reading of images of two pages of an original is executed based on a user instruction will be described.

Overview

Figure 5:
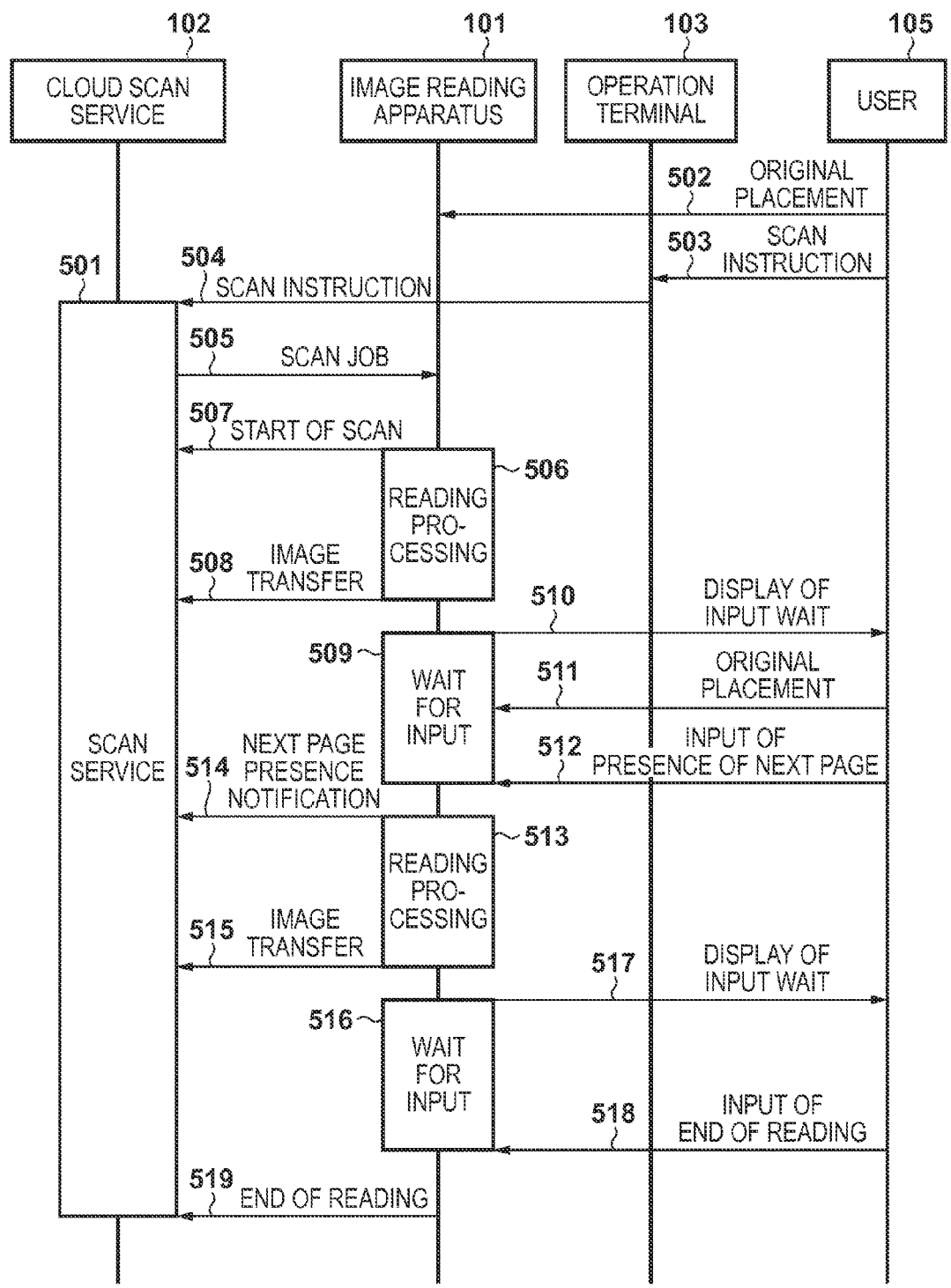
FIG. 5 is a sequence chart showing a sequence performed between the cloud scan service, the image reading apparatus, the operation terminal, and a user in 2-page reading processing.

FIG. 5 is a sequence chart showing a sequence performed when the user uses the operation terminal to cause the image reading apparatus to read the images of second and subsequent pages of an original according to the embodiment. Note that reading of the first page of the original will be described later with reference to FIG. 13.

Referring to FIG. 5, a scan service 501 represents the state of the cloud scan service 102. This corresponds to the scan service 1401 in FIG. 14.

The user 105 who uses the operation terminal 103 places the first page of an original on the reading table (not shown) of the image reading apparatus 101 (502). Next, the user 105 inputs a reading start instruction to the operation terminal 103 (503). In accordance with the instruction input, the operation terminal 103 communicates with the cloud scan service 102 via the Internet 104 and transmits a reading start request (scan instruction) (504).

In the scan service 501, the cloud scan service 102 communicates with the image reading apparatus 101 via the Internet 104 and transmits a scan job in response to the reading start request from the operation terminal 103 (505). Accordingly, the operation of the image reading apparatus 101 changes to a reading state, and reading processing is executed (506). In addition, the image reading apparatus 101 communicates with the cloud scan service 102 and notifies it of the start of reading (507). When the reading processing 506 ends, the read image is transferred from the image reading apparatus 101 to the cloud scan service 102 (508).

In the example shown in FIG. 14, after the image of the first page is transmitted to the cloud scan service 102, the user executes the reading instruction of the second page on the operation terminal 103 (1409 to 1413). In the example shown in FIG. 5, the user executes the reading instruction of the second and subsequent pages on the image reading apparatus 101.

Hence, after the image transfer 508, the operation of the image reading apparatus 101 changes to an input wait state (509). The image reading apparatus 101 then displays, on the display unit 205, a screen as shown in FIG. 6 to indicate that it is waiting for input and prompt the user to read a next image (510).

Figure 6:
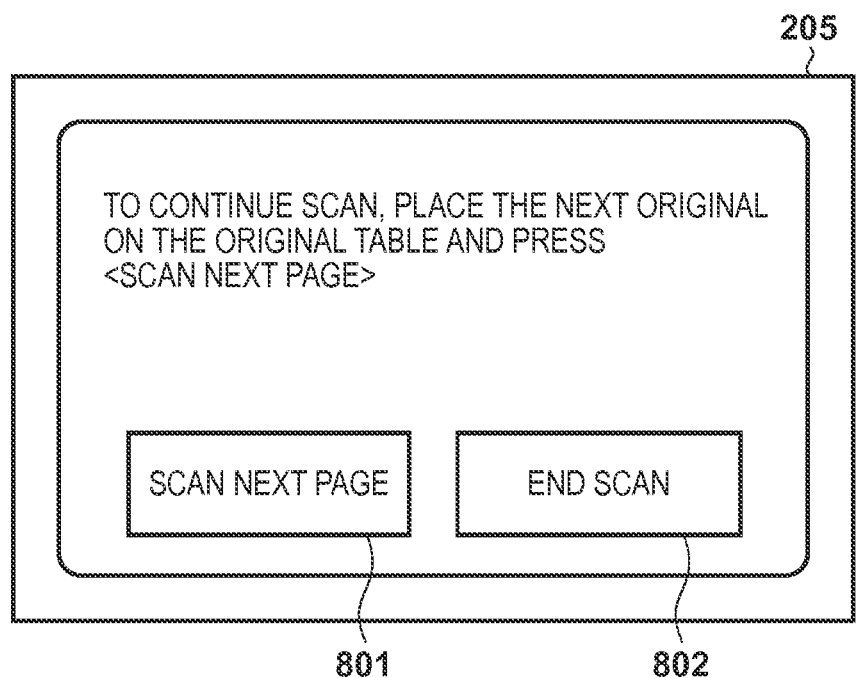
FIG. 6 is a view showing an example of a reading instruction screen displayed on the display unit of the image reading apparatus.

FIG. 6 is a view showing a screen that displays a message to prompt the user to read a next image.

Referring to FIGS. 5 and 6, prompted by the message displayed on the display unit 205 of the image reading apparatus 101, the user 105 places the second page of the original on the original table (511). Then, the user 105 presses an icon 801 for instructing scan of the next page on the screen shown in FIG. 6, which is displayed on the display unit 205, to instruct reading of the next page (512). The input unit 206 of the image reading apparatus 101 receives the instruction and starts reading the next page. The state of the image reading apparatus 101 changes to the reading state again, and reading processing is executed (513).

At this time, the image reading apparatus 101 transmits a next page reading notification to the cloud scan service 102 via the Internet 104 (514). When the reading processing 513 of the second page ends, the read image is transferred from the image reading apparatus 101 to the cloud scan service 102 via the Internet 104 (515).

After that, the operation of the image reading apparatus 101 changes to the input wait state (516). The image reading apparatus 101 displays, on the display unit 205, the screen shown in FIG. 6 again to indicate that it is waiting for input and prompt the user to read a next image (517).

In this example, 2-page original reading has been described. Hence, the user 105 presses an icon 802 for instructing an end of scan on the screen shown in FIG. 6, thereby instructing to end reading (518). In accordance with the instruction, the image reading apparatus 101 communicates with the cloud scan service 102 via the Internet 104 and transmits a reading end notification (519).

Figure 7:
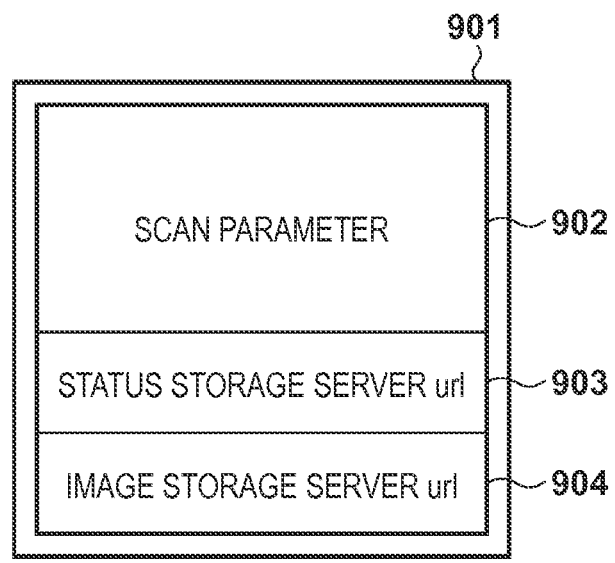
FIG. 7 is a view showing an example of the structure of a scan job.

FIG. 7 is a view showing an example of a scan job transmitted from the cloud scan service 102 to the image reading apparatus 101.

As shown in FIG. 7, a scan job 901 includes portions representing different pieces of information. The constituent elements include a scan parameter 902 representing a scan size or scan resolution, a status storage server url 903 representing the notification destination of a processing state, and an image storage server url 904 representing the transfer destination of a read image.

Figure 8:
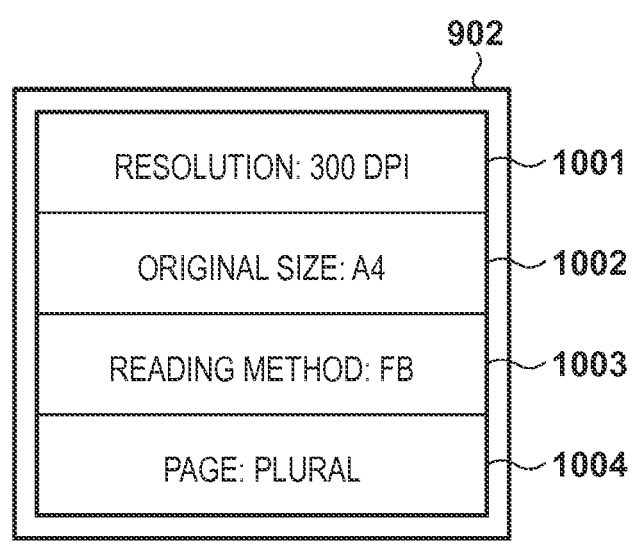
FIG. 8 is a view showing an example of a scan parameter.

FIG. 8 is a view showing an example of the scan parameter 902.

As shown in FIG. 8, the scan parameter 902 is also divided into portions storing different pieces of information. The scan parameter 902 includes a reading resolution 1001, an original size 1002, a reading method 1003, and the number of pages to be read of a scan job. In the example shown in FIG. 8, 300 dpi is designated as the reading resolution 1001, A4 is designated as the original size 1002, FB is designated as the reading method 1003, and "plural" is designated as the number 1004 of pages to be read. Note that the number 1004 of pages to be read is set to "plural" when a file format such as PDF capable of storing a plurality of pages is designated on the screen shown in FIG. 4A. On the other hand, when a file format such as JPEG for storing one image is designated, "1" is set.

Operation of Image Reading Apparatus

Figure 9:
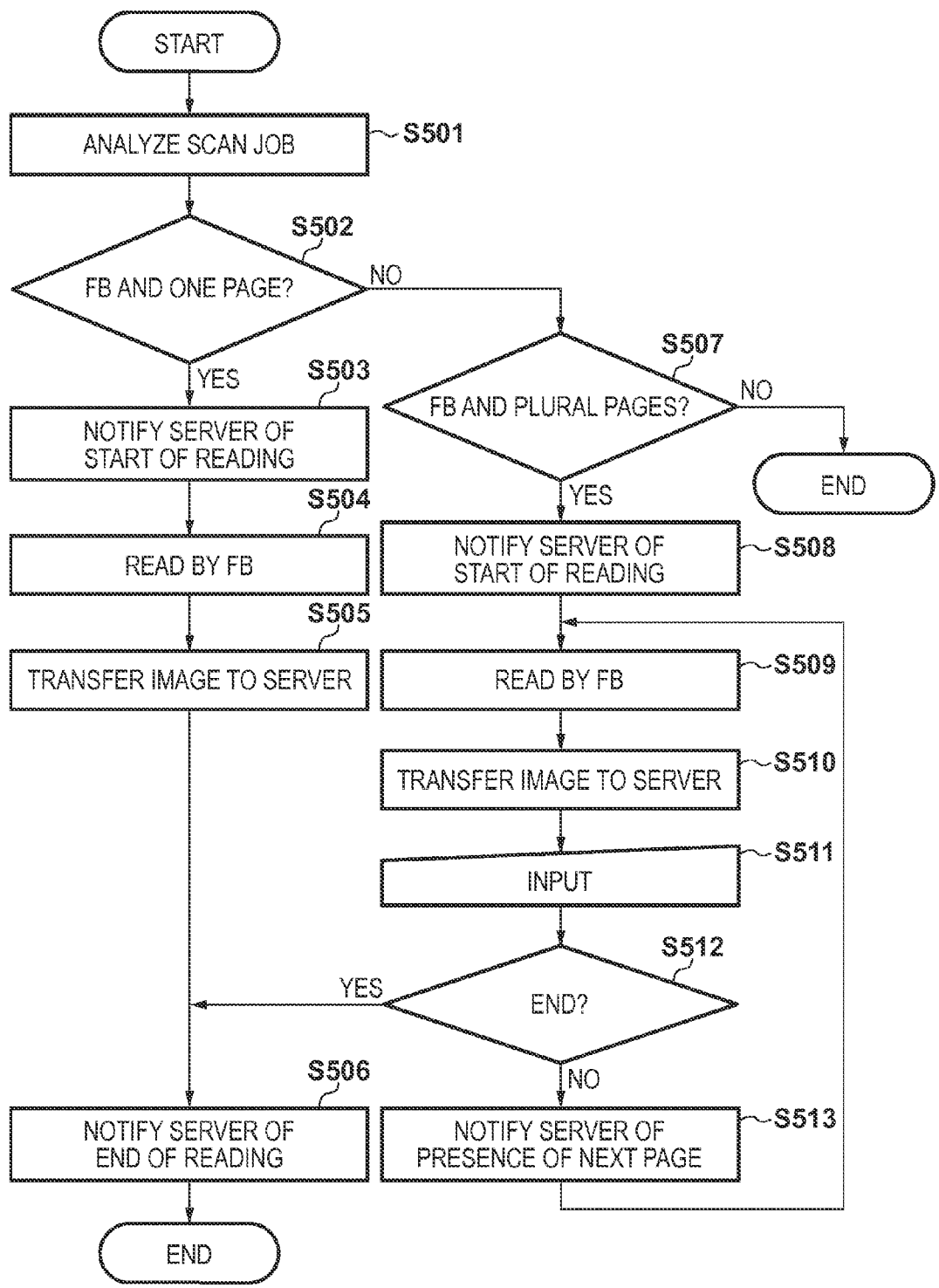
FIG. 9 is a flowchart showing image reading processing of the image reading apparatus.

FIG. 9 is a flowchart showing image reading processing executed by the image reading apparatus 101. Note that a program corresponding to the flowchart shown in FIG. 9 is stored in the ROM 204 of the image reading apparatus 101, and the processing to be described with reference to FIG. 9 is implemented when the CPU 202 executes the program on the RAM 203. Upon receiving the scan job 901 from the scan job generation server 302, the image reading apparatus 101 starts the reading processing.

In step S501, the scan job 901 is analyzed. In step S502, it is checked based on the analysis result whether the reading method 1003 designated in the scan parameter 902 included in the scan job 901 is FB (reading of a flatbed type scanner), and "1" is set to the number 1004 of pages to be read.

In a case where it is determined that the reading method is FB, and the number of pages to be read is "1", the process advances to step S503, and the image reading apparatus 101 notifies the status storage server 304 of the start of reading. In step S504, the reading unit 210 reads an image based on the analysis result of the scan parameter 902. In step S505, image data obtained by reading of the reading unit 210 is transferred to the image storage server 303. After that, in step S506, the image reading apparatus 101 notifies the status storage server 304 of the end of reading.

On the other hand, in a case where it is determined that the reading method is FB, and the number of pages to be read is not "1", the process advances to step S507 to check whether the reading method is FB, and the number of pages to be read is "plural".

In a case where it is determined that the reading method is FB, and the number of pages to be read is "plural", the process advances to step S508, and the image reading apparatus 101 notifies the status storage server 304 of the start of reading. In step S509, the reading unit 210 reads an image based on the analysis result of the scan parameter 902. In step S510, image data obtained by reading of the reading unit 210 is transferred to the image storage server 303. In step S511, a message as shown in FIG. 8 is displayed on the display unit 205 to prompt the user to determine whether to read the next page of the original or instruct to end the reading.

If the input is done, the process advances to step S512 to check whether the input of the input unit 206 is a reading end instruction. In a case where it is determined that the input is a reading end instruction, the process advances to step S506 to notify the status storage server 304 of the end of reading, as described above. On the other hand, in a case where it is determined that the input is not a reading end input instruction but a reading instruction of a next page of the original, the process advances to step S513, and the image reading apparatus 101 notifies the status storage server 304 of the start of reading of the next page. After that, the process returns to step S509.

Note that in a case where it is determined in step S507 that the reading method is not FB, and the number of pages to be read is not "plural", the processing ends.

Processing in Cloud Scan Service

Figure 10:
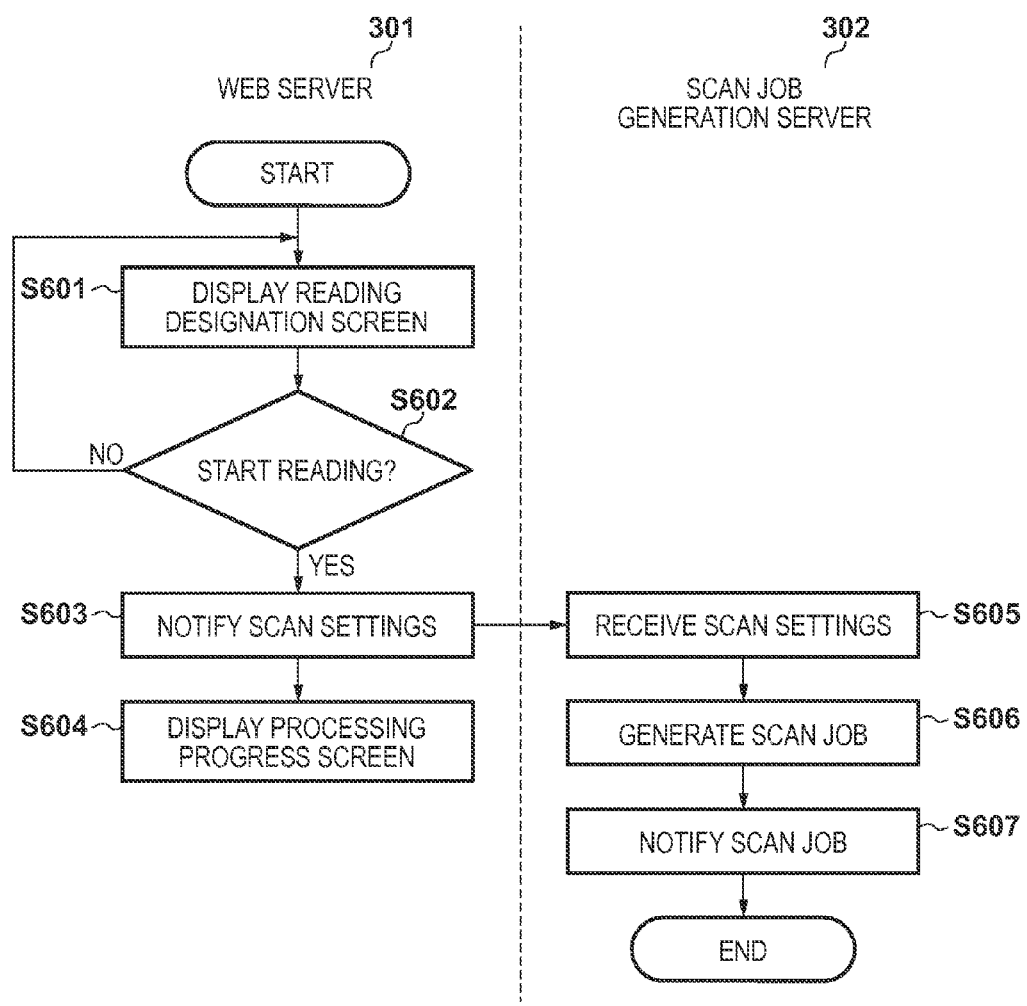
FIG. 10 is a flowchart showing processing executed in the cloud scan service to notify the image reading apparatus of a scan job.

FIG. 10 is a flowchart showing processing executed in the cloud scan service 102 to notify the image reading apparatus 101 of a scan job. Note that a program corresponding to the processing of the flowchart shown in FIG. 10 is stored in a ROM or HDD included in each server provided by the cloud scan service 102. The processing to be described with reference to FIG. 10 is implemented when the CPU of each server executes the program on the memory. Referring to FIG. 10, steps S601 to S604 are processes executed in the web server 301, and steps S605 to S607 are processes executed in the scan job generation server 302.

In step S601, display control is performed to display the web page 401 shown in FIG. 4A on the operation terminal 103. The web page 401 is a scan setting designation screen, and the user 105 can input various scan settings on the operation terminal 103. In step S602, display control is performed to display the web page 404 shown in FIG. 4B on the operation terminal 103. FIG. 4B shows a reading start confirmation screen. If the user presses the icon 406 during display of the screen, the process advances to step S603. On the other hand, if the user presses the icon 405, the process returns to step S601.

In step S603, the scan job generation server 302 is notified of the scan settings designated in step S601. In step S604, display control is performed to display the web page 407 shown in FIG. 4C on the operation terminal 103.

The above-described web page creation processing is executed in the web server 301. Each web page is transmitted via the web server 301 and displayed on the screen of the operation terminal 103.

In step S605, the scan job generation server 302 receives the scan settings from the web server 301. In step S606, the scan job 901 is generated from the received scan settings. In step S607, the generated scan job 901 is transmitted to the image reading apparatus 101.

Figure 11:
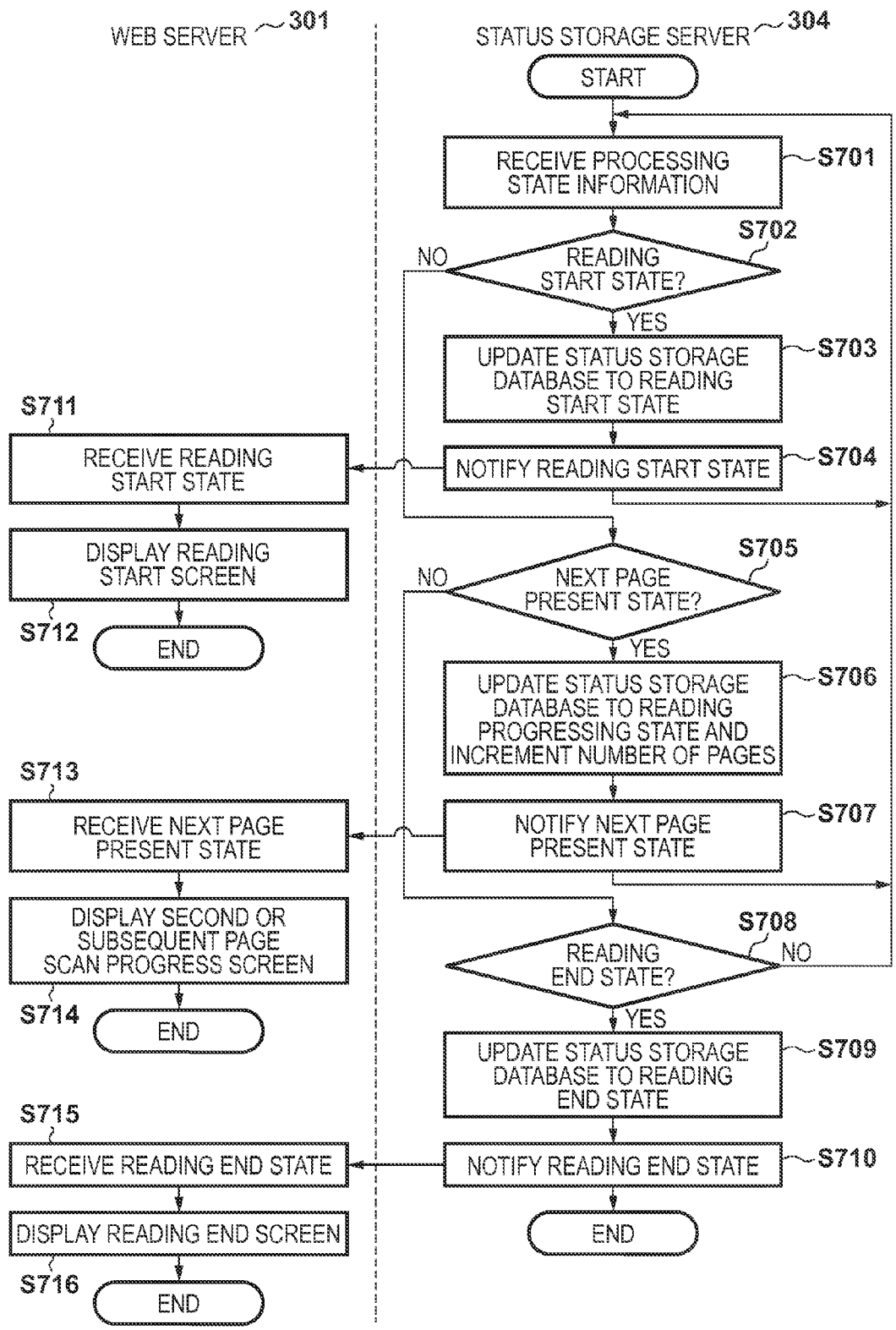
FIG. 11 is a flowchart showing processing executed in the cloud scan service when a processing state information notification is received from the image reading apparatus.

FIG. 11 is a flowchart showing processes in the status storage server 304 and the web server 301 when the status storage server 304 has received a notification from the image reading apparatus 101 in step S503, S506, S508, or S513. Referring to FIG. 11, steps S701 to S710 are processes executed in the status storage server 304, and steps S711 to S716 are processes executed in the web server 301. Note that a program corresponding to the flowchart shown in FIG. 11 is stored in a ROM or HDD included in each server. The processing to be described with reference to FIG. 11 is implemented when the CPU of each server executes the program on the memory.

In step S701, processing state information reflecting the progress state of image reading notified by the image reading apparatus 101 in step S503, S506, S508, or S513 is received. In step S702, it is confirmed whether the received processing state information represents a reading start state. In a case where it is confirmed that the image reading apparatus 101 is in the reading start state, the process advances to step S703. Otherwise, the process advances to step S705.

In step S703, the reading start state is stored in the status storage database. In step S704, the web server 301 is notified of the reading start state. In accordance with the notification, the web server 301 receives the reading start state in step S711 and displays the reading start screen 407 shown in FIG. 4C on the operation terminal 103 in step S712.

In step S705, the presence/absence of a next page of the read original is checked based on the received processing state information, and it is confirmed whether the processing state information represents a state in which a next page exists (next page present). In a case where it is confirmed that the received processing state information represents "next page present", the process advances to step S706. Otherwise, the process advances to step S708.

In step S706, a reading progressing state is stored in the database, and the value of the number of read pages of the original is incremented. In step S707, the web server 301 is notified of the "next page present" state. In accordance with the notification, the web server 301 receives the "next page present" state in step S713. Additionally, in step S714, the web server 301 creates a web screen (not shown) representing that the second or subsequent page is being scanned, and transmits it to the operation terminal 103.

In step S708, it is confirmed whether the received processing state information represents a reading end state. In a case where it is confirmed that the received processing state information represents a reading end state, the process advances to step S709. Otherwise, the process returns to step S701. In step S709, the reading end state is stored in the database, and the state is updated. Finally in step S710, the web server 301 is notified of the reading end state. In accordance with the notification, the web server 301 receives the reading end state in step S715, and also creates the reading end screen 408 as shown in FIG. 4D and transmits it to the operation terminal 103 in step S716. When the user presses an OK icon 409 on the operation terminal 103, all reading processes end.

Note that after step S715, the web server 301 may acquire the read image data from the image storage server 303 and transmit it to another cloud server.

Note that the above-described processing shows an example in which an original with two pages is read but is also applicable to reading of an original with one page.

Figure 12:
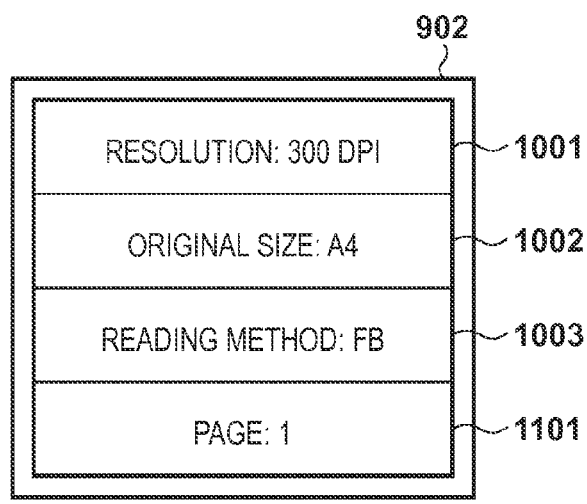
FIG. 12 is a view showing an example of a scan parameter used in 1-page reading processing.

FIG. 12 is a view showing an example in which conditions of 1-page original reading are designated in the scan parameter 902. As can be seen from comparison of FIGS. 8 and 12, in this example, the reading resolution 1001, the original size 1002, and the reading method 1003 are the same as in the example shown in FIG. 8, but "1" is set to the number 1101 of pages to be read.

Figure 13:
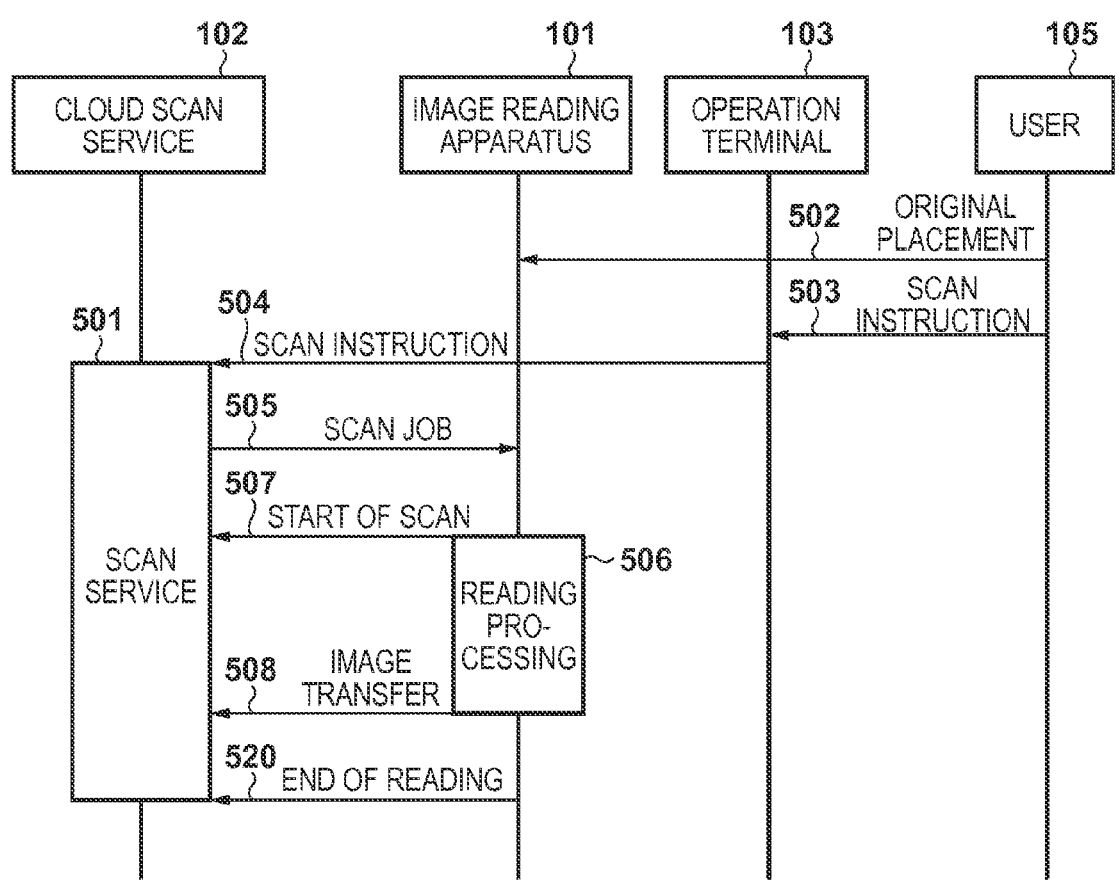
FIG. 13 is a sequence chart showing a sequence performed between the cloud scan service, the image reading apparatus, the operation terminal, and the user in 1-page reading processing.

FIG. 13 is a sequence chart showing a sequence performed when the user uses the operation terminal to cause the image reading apparatus to read the image from an original with one page according to the embodiment. Note that the same reference numerals as described with reference to FIG. 5 denote the same sequences or operations in FIG. 13, and a description thereof will be omitted.

In 1-page reading processing, after the end of the reading processing 506, the image data obtained by causing the reading unit 210 to read the original is transferred from the image reading apparatus 101 to the cloud scan service 102 (508). After that, the image reading apparatus 101 transmits a reading end notification to the cloud scan service 102 (520).

Hence, according to the above-described embodiment, the user performs instructions concerning reading of the first page of the original on the operation terminal 103. For this reason, for example, in a case where the user accesses the cloud scan service 102 using the operation terminal 103, he/she can input a reading instruction or a reading setting instruction by simply operating the operation terminal 103. The user performs the reading instruction of the second and subsequent pages of the original on the image reading apparatus 101. For this reason, after placing the second or subsequent page of the original on the image reading apparatus 101, the user can input the reading instruction of the image of the second or subsequent page by simply operating the image reading apparatus 101.

That is, since the user can perform the operation when starting original reading from his/her operation terminal, and original placement and operations during image reading on the image reading apparatus, user operability can be improved.

When reading the second page, it is unnecessary to perform communication between the operation terminal and the image reading apparatus via the cloud scan service using the Internet or generation of a new scan job. This can reduce processes via the Internet. It is therefore possible to implement a quick reading start and also quickly perform the operation of starting reading of a next page at the same time as original placement on the image reading apparatus. This implements reading of images of a plurality of pages in the image reading apparatus including a flatbed type scanner, with improved user operability.

Note that although a flatbed type scanner has been described above, for example, a scanner including an ADF (Auto Document Feeder) may be used. In the ADF, a plurality of pages of an original can be read by one reading instruction. The ADF can also read, for example, three pages of an original based on the first reading instruction and two additional pages based on the second reading instruction. For example, the user may input the first reading instruction on the operation terminal 103 and the second reading instruction on the image reading apparatus 101.

In the above embodiment, an example in which the image reading apparatus 101 does display on the display unit 205 of its own has been described. However, the present invention is not limited to this. For example, the image reading apparatus 101 may perform display control to do various kinds of display according to the embodiment on an external display device connected to the image reading apparatus 101.

In the above embodiment, an example in which the image reading apparatus 101 transfers an image read by the reading unit 210 to the server has been described. However, the present invention is not limited to this. For example, the read image may be saved in an external or internal memory or printed on a print medium (for example, print sheet) by a print unit (not shown).

Note that the implementation form of the operation terminal 103 may be not a laptop or desktop personal computer (PC) but a smartphone or a tablet terminal, and any type of operation terminal is usable as long as it can be connected to the Internet.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-139163, filed Jul. 4, 2014, which is hereby incorporated by reference herein in its entirety.

What is claimed is:

1. An image reading apparatus capable of being connected to a server via a network, and reading an image of an original based on a reading instruction from a user terminal via the server, comprising:
    a reading unit configured to read the image of the original;
    a display unit configured to display a message to prompt a user to input an instruction concerning reading of a next original after the image of the original is read by said reading unit in accordance with the reading instruction from the user terminal; and
    an input unit configured to input an instruction from the user to the display by said display unit.

2. The apparatus according to claim 1, further comprising a notification unit configured to notify the server of a start of reading of the next original by said reading unit, an end of reading by said reading unit, and presence/absence of an original to be read next in accordance with the instruction input by said input unit.

3. The apparatus according to claim 2, wherein the reading instruction from the user terminal via the server includes a reading resolution, an original size, a reading method, and a number of pages to be read, and
    said reading unit reads the image of the original in accordance with the reading instruction.

4. The apparatus according to claim 3, wherein in a case where the number of pages to be read represents a plurality of pages,
    said notification unit notifies the server of the end of reading by said reading unit every time reading of the original ends, and
    said display unit performs the display to prompt the user to perform a next operation every time reading of the original ends.

5. The apparatus according to claim 4, wherein the display to prompt the user to perform the next operation is a display to prompt the user to input one of the reading instruction for the next original and an instruction to end reading.

6. The apparatus according to claim 1, wherein said display unit and said input unit are formed by a display with a touch panel.

7. The apparatus according to claim 1, wherein said reading unit includes a flatbed type scanner.

8. The apparatus according to claim 1, further comprising a transfer unit configured to transfer, to the server, image data obtained by causing said reading unit to read the image of the original.

9. An image reading method of an image reading apparatus capable of being connected to a server via a network, and reading an image of an original based on a reading instruction from a user terminal via the server, comprising:
    causing a display unit included in the image reading apparatus to display a message to prompt a user to input an instruction concerning reading of a next original after the image of the original is read by the image reading apparatus in accordance with the reading instruction from the user terminal; and
    inputting an instruction to the image reading apparatus from the user to the display.

10. The method according to claim 9, further comprising notifying the server of a start of reading of the next original in the image reading apparatus, an end of reading in the image reading apparatus, and presence/absence of an original to be read next in accordance with the input instruction.

11. The method according to claim 10, wherein the reading instruction from the user terminal via the server includes a reading resolution, an original size, a reading method, and a number of pages to be read, and
    the image of the original is read by the image reading apparatus in accordance with the reading instruction.

12. The method according to claim 11, wherein in a case where the number of pages to be read represents a plurality of pages,
    the server is notified of the end of reading in the image reading apparatus every time reading of the original ends, and
    the display to prompt the user to perform a next operation is displayed on the display unit every time reading of the original ends.

13. The method according to claim 12, wherein the display to prompt the user to perform the next operation is a display to prompt the user to input one of the reading instruction for the next original and an instruction to end reading.

14. The method according to claim 9, wherein the display and the input are done by a display unit with a touch panel.

15. The method according to claim 9, wherein the image reading apparatus includes a flatbed type scanner.

16. The method according to claim 9, further comprising transferring, to the server, image data obtained by causing the image reading apparatus to read the image of the original.

17. An image reading system formed by connecting an image reading apparatus capable of being connected to a server via a network, and reading an image of an original based on a reading instruction from a user terminal via the server, the user terminal, and the server via the network,
    wherein the image reading apparatus comprises:
        a reading unit configured to read the image of the original;
        a display unit configured to display a message to prompt a user to input an instruction concerning reading of a next original after the image of the original is read by the reading unit in accordance with the reading instruction from the user terminal; and
        an input unit configured to input an instruction from the user to the display by the display unit,
    the user terminal comprises:
        an instruction unit configured to send the reading instruction of the original to the server; and a display unit configured to receive, from the server, a state according to progress of image reading by the image reading apparatus and display the state, and the server comprises:
a first transmission unit configured to create an image reading instruction to the image reading apparatus and transmit the image reading instruction to the image reading apparatus based on the reading instruction from the user terminal; and a second transmission unit configured to transmit the state according to progress of image reading by the image reading apparatus to the user terminal to display the state on the display unit of the user terminal based on a notification from the image reading apparatus.

18. The system according to claim 17, wherein the user terminal includes a personal computer, a smartphone, and a tablet terminal.

19. A non-transitory computer readable storage medium which stores a computer program to be executed in a processor of an image reading apparatus capable of being connected a server via a network, and reading an image of an original based on a reading instruction from a user terminal via the server, the program comprising:

causing a display unit included in the image reading apparatus to display a message to prompt a user to input an instruction concerning reading of a next original after the image of the original is read by the image reading apparatus in accordance with the reading instruction from the user terminal; and inputting an instruction to the image reading apparatus from the user to the display.

\* \* \* \* \*